April 24, 1928.
H. DREYER
1,667,246
RAILWAY TRACK INSPECTION APPARATUS
Filed March 26, 1926 4 Sheets-Sheet 1
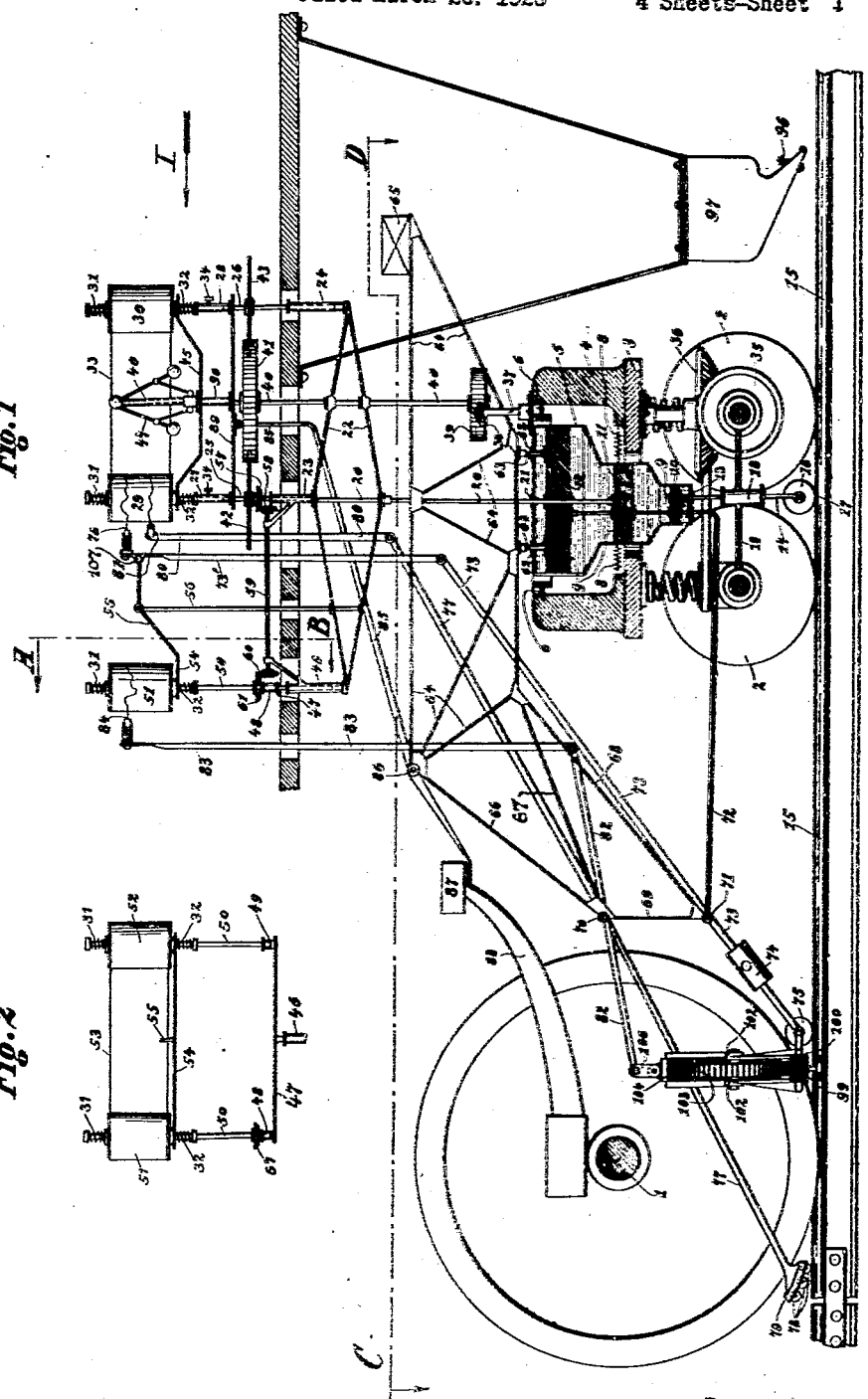
Hans Dreyer
INVENTOR
his ATTY.

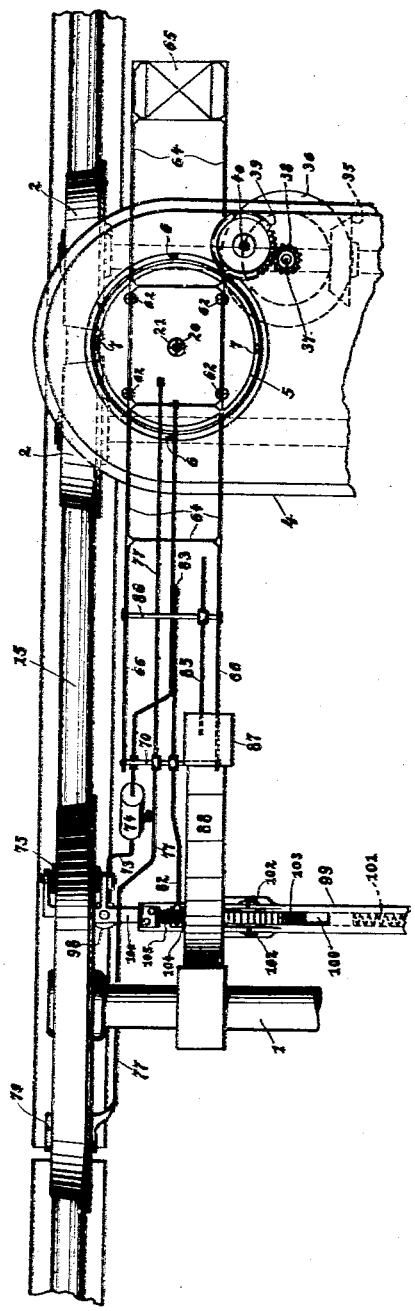

April 24, 1928.
H. DREYER
1,667,246
RAILWAY TRACK INSPECTION APPARATUS
Filed March 26, 1926
4 Sheets-Sheet 3
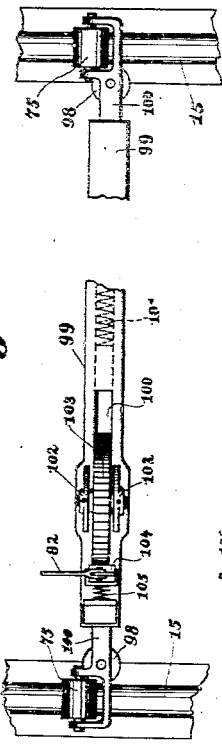
Hans Dreyer
INVENTOR
By [signature]
his ATTY April 24, 1928.
H. DREYER
1,667,246
RAILWAY TRACK INSPECTION APPARATUS
Filed March 26, 1926    4 Sheets-Sheet 4
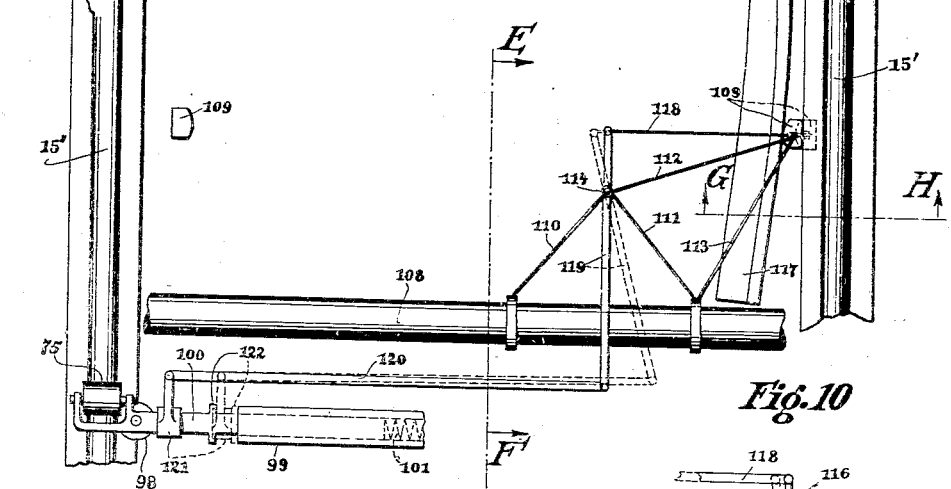
*Fig.8*
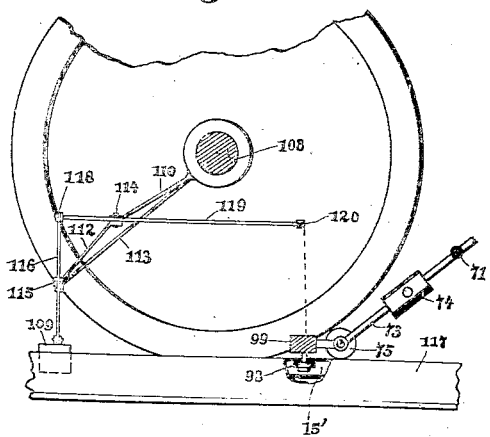
*Fig.9*
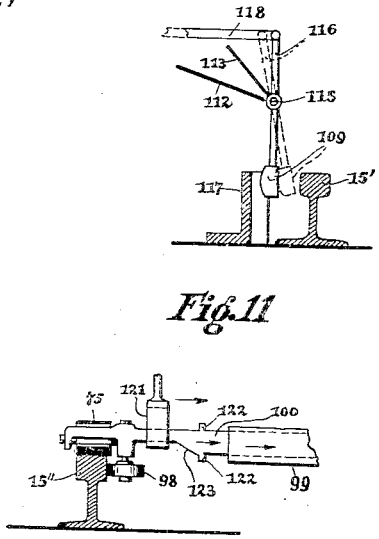
*Fig.10*
*Fig.11*
HANS DREYER
INVENTOR
By
his ATTY Patented Apr. 24, 1928.

1,667,246

UNITED STATES PATENT OFFICE.

HANS DREYER, OF MUNICH-HARLACHING, GERMANY.

RAILWAY-TRACK INSPECTION APPARATUS.

Application filed March 26, 1926, Serial No. 97,805, and in Germany November 17, 1924.

My invention relates to railway-track inspection apparatus, and its object is to enable the permanent way to be inspected from a moving car or train, and any defective part or parts to be readily detected. The inspection herein contemplated extends to the detection of possible changes in track level as well as changes in gauge.

The essence of the invention resides in so arranging in the movable train or car, the apparatus for detecting defects as well as that for registering or indicating the same, that these several devices or apparatuses are unaffected by the impacts, swayings and jerkings of the car and reliable indications under all conditions are obtained.

The invention consists in the structural features and combinations hereinafter fully described and claimed, and illustrated in the accompanying drawings in which Fig. 1 is a plan view, partly in section, of the device shown in Fig. 3; Fig. 2 is a section on the line A—B of Fig. 1; Fig. 3 is a section on the line C—D of Fig. 1; Fig. 4 is a side elevation of Fig. 1 looking in the direction of the arrow 1; Fig. 5 is a partial development of a recording tape and certain parts cooperable therewith; Fig. 6 is a plan of the gauge meter or measuring device; Fig. 7 an elevation, partly in section, of the device of Fig. 6; Fig. 8 an elevation of the mechanism for rendering the measuring devices inoperative on switches and crossings; Fig. 9 a section on the line E—F of Fig. 8; Fig. 10 a section on the line G—H of Fig. 8, and Fig. 11 a fragmentary elevation of the device of Fig. 8.

Between two sufficiently spaced and adequately weighted shafts of a car, one such shaft being indicated at 1 in Fig. 1, there is arranged a low two-shafted carriage 2 which is so connected with the two adjacent car shafts that pull in a horizontal direction only is exerted on the shafts of the carriage. The carriage 2 is of such light construction that the rails are not measurably depressed by its weight. The platform 3 of the carriage 2 is carefully spring cushioned with respect to each of the rails.

Carried by the carriage 2 is a supporting bearing 4 which supports two containers 5 suitably insulated so as not to be affected by extremes of temperature. Each of these containers is designed to supervise one of the rails, in a manner to be hereinafter fully explained. For the purpose of simplifying the illustration only one container and the corresponding rail are shown. Each container has three different annular cross sections; it bears universally in the bearing 4 so that its shaft will always be vertical in uphill or downhill stretches, irrespective of the effect of the grade on the position of the platform and of the movements of the platform. These movements are small, because by reason of the lightness of the carriage only very light pressure thrusts can occur. The bearings for universally suspending the containers are indicated at 6 and 7 in Figs. 1 and 3. Lateral oscillations of the container 5 are limited by springs 8 having ends connected, respectively, to the bearing 4 and the container 5. The container is filled with oil under pressure, and operable in the three cross sections of the container are the pistons 10, 11 and 12 respectively, each piston having a small axial duct or channel 9. The oil acts to damp or brake the movement of the pistons in the respective chambers or cross sections of the container. The piston 10, having the smallest cross section, is provided with a rod 14 extending through a stuffing box 13 in the container 5, and the lower end of rod 14 carries a roller 16 travelling on the rail 15, the construction being such that when the roller 16 comes into contact with a point 17 which is not level with the remainder of the rail stretch, the piston 10 is acted upon. The rod 14 is guided vertically by a guide sleeve 18 carried by a bar 19 supported by the carriage 2, and the sleeve 18 also assures the rod against lateral movement.

The cross section of the piston 11 is substantially greater than that of the piston 10, so that the effect of pressure thrusts on the piston 10 is transmitted to the piston 11, reduced in the same ratio as the relative sizes of the pistons. Piston 11 carries an upwardly extending rod 20, which passes through the piston 12 of greatest cross section as well as movable through a stuffing box 21 in the container 5, and at its upper end the rod 20 carries a frame 22, which is provided with guide sleeves 23 and 24 in which shafts 25 and 26 are rotatably supported. Adjustable on the shafts 25 and 26 are bearing sleeves 27 and 28 carrying drums 29 and 30. The drums which are arranged between upper and lower springs 31 and 32, are axially movable on shafts 27 and 28 but are prevented from rotating thereon.

Passing over the drums 29 and 30 is a tape 33 on which are recorded changes in the level of the rails 15 as determined by the passage of the train or car thereover. Inasmuch as the change of level of the rails under the moving load depends upon the size of the load, the vertical position of the drums 29 and 30 must be adjusted, at the beginning of the trip, in accordance with the load. To this end the sleves 27 and 28 which carry the drums are axially adjustable on the shafts 25 and 26 and may be held in adjusted positions by the set screws 34.

The drums 29 and 30 (and the tape 33) are actuated from one wheel of the carriage 2 through the medium of bevel gears 35 and 36 and a vertical driving shaft 37. The latter carries at its upper end a pinion 38 meshing with a gear wheel 39 at the lower end of a vertical shaft 40 bearing rotatably in the frame 22. At its upper end the shaft 40 carries a gear wheel 41 meshing alternatively with gear wheels 42 and 43 carried by the shafts 25 and 26, respectively. It will, thus, be noted that the gear wheels 39, 41, 42 and 43 are carried by the intermediate piston 11 of the container 5.

To render harmless any pressure thrusts which may be exerted against the carriage 2 the width of wheel 39 is such that pinion 38 can move vertically without getting out of mesh with wheel 39. The relatively slight, elastic movement of the track which is proportional to the speed of the train thereover, is taken care of by means of a governor 44, driven by shaft 40, and which governor through the intermediary of a lever 45 raises or lowers the drums 29 and 30 on the shafts 27 and 28 the desired extent dependent upon the speed of the train. It will be understood that, initially, the governor 44 is set for a given permanent way on the basis of observations of the elastic line of the rails under a moving load from a point outside of the rails.

Frame 22 has an upright bar 46 supporting a cross head 47 (Fig. 2) which carries sleeve bearings 48 and 49. Bearing in the sleeves 48 and 49 are shafts 50 upon which drums 51 and 52 are movable axially but held against rotary movement. Running over the drums 51 and 52 is a tape 53 upon which changes of gauge (spreading or converging of rails) is recorded. The drums 51 and 52, like the drums 29 and 30, are arranged between springs 31 and 32 and may be vertically adjusted by means of a bridge 54 and a lever 55, the latter being supported on the frame 22 through the intermediary of a bar 56. The purpose of this arrangement will be explained hereinafter. Shaft 50 of drum 51 is driven from shaft 25 of drum 29 by a train of bevel gears 57, 58, 59, 60 and 61. This movement is transmitted to tape 53 as well as to drum 52.

Piston 12, which has the greatest diameter of the three pistons, is provided with four rods 63 passing through stuffing boxes 62 in the container, these rods carrying a frame 64 having a counter-weight 65 at one side thereof. At the other side the frame 64 has struts 66, 67, 68 and 69 which support two horizontal rotary shafts 70 and 71. Fixed to the piston 12 and extending downwardly through the pistons 11 and 10 and the bottom of the container 5 is a strut 72 which supports the shafts 70 and 71. Bearing on shaft 71 is a lever 73 the lower shorter arm of which carries a weight 74 and a hardened roller 75 running on the rail 15, the length of the roller being such that it will always have a part thereof in contact with the rail head even when rounding curves. The other arm of the lever 73 is connected with a bar 73' provided at its upper end with a stylus 76 spring pressed into contact with the tape 33. By means of the roller 75, the lever 73, the bar 73' and the stylus 76, the vertical movements of the rails under the train are reproduced on an enlarged scale on the tape 33, while the effect of horizontal movements is eliminated by the fact that the roller 75 may freely displace itself on the rail vertically to the rail.

Bearing on rotary shaft 70 is a two armed lever 77 provided at its lower end with a segment 79 carrying rollers 78, while the other end of the lever has a rod 80 holding a stylus 81 designed to record on the tape 33. The rollers 78 run on rail 15 in front of the wheel of the vehicle (car), so that the differences in level of adjacent rails imparted to these rollers are recorded on the tape 33. Also bearing on shaft 70 is a lever 82 which serves for transmitting changes of track gauge. Lever 82 is connected with a vertical rod 83 having a stylus 84 for marking a record on tape 53. The method of operation of this arrangement will be described later.

The relation of the cross section of piston 12 to the cross section of piston 11 is such as is required by the translation relationship of the measuring rods 73 and 77 in order that the effect of pressure thrusts on the drums 29, 30 and 51, 52 as well as on the styluses 76, 81 and 84 is diminished to the same degree.

Assuming that the detection roller 16 receives a slight thrust or impact, the latter is at first transmitted to the oil in the container 5 and the effect of this impact on the tape drums as well as on the styluses is damped to an extent to render it harmless, while the platform 3 with the container 5 remain at rest because of the spring cushioning of the platform. In the succeeding time interval the impact is also transmitted to the platform 3 and the container 5 so that the latter is raised somewhat, but at the same time the raised part 17 lowers (or rather is left behind the roller 16 which has passed it) and the pistons 10, 11 and 12 descend correspondingly. In this manner the pressure thrusts occurring under the detection wheel 16 are rendered harmless to the extent necessary for the accuracy of the desired measuring operation. With a slow change of the level of the observation point 17, which change is not caused by pressure thrusts, (e. g. on grades), the detection roller 16, the oil container 5, the measuring rods, levers and tape drums all participate in the movement to the same extent.

The relation of the length of the arms of levers 73 and 77 corresponds to the scale in which the translated movements (lowering of the rails) are to be recorded. For example, if an $n$-times enlargement of the measured rail descent is desired and the relation of the cross sectional surfaces of the pistons 10 and 11 is $\frac{1}{m}$ then the cross section of the piston 12 must have $m(n+1)$ times the surface of the piston 10. In the form shown in the drawing, the translation relationship of the two levers 73 and 77 differs so that the curves recorded on tape 33 are in correspondingly different scales.

The movements of the tapes 33 and 53 correspond to the speed of the train in such manner that the distance travelled by the train appears on the tapes in the desired scale, and at the same time clockwork mechanism indicates, in a manner well known in this art, the speed at which the train travelled the stretch.

The vertical adjustment of the drums 29 and 30 for a definite load, before beginning the trip, is effected (Fig. 1) by means of a lever 85 which oscillates about a shaft 86 carried by the frame 64 and which lever, before starting on the trip, is so adjusted that one of its arms contacts a stop 87 on the supporting spring of the car while its other arm acts on a bridge 89. The bridge 89 engages the hollow shafts 27 and 28 of the drums 29 and 30 as well as the hollow shaft 90 which carries the centrifugal governor 44 (the governor being lengthwise movable but not rotatable on shaft 90) in such manner that, after loosening screw 34 the lever 85 which will be depressed by stop 87 under load will raise the drums 29 and 30 together with the centrifugal governor. In the new position of the parts the screws 34 are again tightened whereby the drums and the governor are secured in their new positions. Before the train starts the lever 85 is again moved away.

In order that defective parts or positions of the rails may not only be recorded but also brought to the attention of the crew during the run, the tape 33 (Fig. 5) is provided with a run chart 91 of copper mesh. The run chart bears a reproduction of the standard inclinations and elevations of the rails, when without load, at such a distance from the zero axis, that upon occurrence of improper vertical rail movements the stylus 76 will contact with the copper strip 91 and close a circuit which is supplied with current from the battery 92. Included in the circuit is a visual or audible signal 93 which, when it operates, will indicate to the crew that the stretch of track over which the car or train is passing is defective in some particular. Also included in the circuit is an electromagnet 94 which acts counter to the action of a spring 95 to open the valve 96 of a dye or paint receptacle 97, whereby the defective part of the track will be sprayed with paint for ready identification by the repair crew. The paint receptacle common for both rails is suspended on the outer surface of the car floor in the rear of the detection carriage 2.

As shown in Figs. 6 and 7, the gauge measuring apparatus consists of a long, round or rectangular, rod 99 running on rollers 98. One end of the rod 99 is hollow and contains a bar 100 displaceable axially against a spring 101. The gauge meter is rigidly secured to the rollers 75. In Fig. 6 the rollers 75 for both rails 15 are shown.

The bar 100 is provided with rack teeth meshing with a gear wheel 103 supported in bearings 102 formed on the rod 99; the construction and relation of parts being such that any change of gauge is transmitted to a vertical bar 104 which is pressed by springs 105 into engagement with the gear wheel 103. Rack bar 104 is wider than gear wheel 103 to compensate for any horizontal movements or swayings of carriage 2. Inasmuch as the shaft of gear wheel 103 is carried by the gauge meter 99, it participates in any vertical movements of the rails. Rack bar 104 acts against a lever 106 which is articulated to the lever 82 oscillatable about shaft 70 (Fig. 1). Those movements of the rack bar 104 and of the stylus 84 (through which changes of gauge are recorded on tape 53) caused by the vertical movement of the rails are eliminated by articulating lever 55 (Fig. 1) at 107 with rod 73' which follows the vertical movements of the rails. The drums 51 and 52 are raised each time by the lever 55 to the same extent that the stylus 84 descends in consequence of the normal vertical movements of the rails so that this movement has no effect of the gauge measurement.

As for the rest, the gauge measuring apparatus in so far as its coaction with the tape roller is concerned, is the same as the apparatus for detecting rail depressions and the passage from one rail to the other.

In order that the detection carriage may also operate during passage through stations, without putting the measuring devices out of operation for long periods, the arrangement illustrated in Figs. 8, 9, 10 and 11 is used.

Carried by the car shaft 108, which is in advance of the roller 75 and the gauge meter 98, are oppositely arranged heavily spring loaded small rollers or gliders 109. In Figs. 8 to 11 the arrangement for but one rail 15' is shown, the construction for the other rail being exactly the same. Secured to the shaft 108 are struts 110, 111, 112 and 113, the struts 110 and 111 carrying rotatable shaft 114 and the struts 112 and 113 carrying rotatable shaft 115. Oscillatable about shaft 115 is a lever 116 carrying at its lower end the rollers 109 in such manner that the inner face thereof directed toward the rail axis is so spaced from the inner face of the rail head that when the rollers pass the ramp rail 117 of the switch this inner face is gradually pressed in the direction of the rail 15'.

The deflected roller 109 oscillates the lever 119 by means of the lever 116 and of a lever 118 oscillatable about the shaft 114. The lever 119, by means of a draw bar 120, presses a sleeve 121 slidable on part 100 of the gauge meter against a stop 122, and draws inwardly (direction of arrow in Fig. 8) against the action of spring 101 the part 100, thereby raising from rail 15' the roller 98 of the gauge meter as well as the roller 75 for vertical variations, which would otherwise be unguided. Part 100 has an ascending inclined enlargement 123 so that by movement of the sleeve 121 against the enlargement the gauge meter is at the same time slightly raised and held in the raised position. With the gradual widening of the gauge stretch between ramp rail 117 and rail 15' the previously deflected roller 109 and with it the rods 116, 118, 119 and 120 reassume their previous positions under the action of spring 101. Hence the measuring operation is interrupted only while the detection carriage passes through or over a frog.

The difference in length of the arms of lever 119, the normal spacing between the sleeve 121 from the stop 122, and the formation of the surface 123 are such that observation or detection of the permanent way cannot be interfered with and that a lateral movement of the vehicle (railway car) is without effect thereon.

The other glider or roller which is merely indicated in Fig. 8 acts against the same spring 101 in the same manner as the oppositely arranged part of the gauge meter.

The passage through the frog of a switch can be detected on the diagram or chart by the fact that at the corresponding point in the curve of the gauge measurement an exceptionally small value is indicated whereas in measuring the vertical position of the rails an elevation thereof over the position of the rail without load is either prominently indicated or entirely omitted.

I claim:—

1. In apparatus for recording railway track imperfections, the combination with a suitable carrier vehicle of an auxiliary recorder carriage located intermediate the wheels of said vehicle, recorder supporting means supported by universal joint connections from said recorder carriage, recording tape operating drums supported by said recorder supporting means, recording means cooperating with said tape, means cooperating with the track to be operated by imperfections therein, and operating connections between such track cooperating means and the recording means, said track cooperating and recorder operating means being supported from said recorder supporting means.

2. Apparatus according to claim 1, in which the auxiliary carriage supports a bearing member having an open center and the recorder supporting means includes a liquid container supported for universal movement in said open center and having piston means rigidly connected to the recorder means.

3. Apparatus according to claim 1, in which the auxiliary carriage supports a bearing member having an open center and the recorder supporting means includes a liquid container supported for universal movement in said open center, said liquid container having cylindric portions of different diameter, and pistons of corresponding diameter in said cylindric portions, one of which pistons carries the recorder drums and another the track cooperating means.

4. In apparatus for recording railway track imperfections, the combination with a suitable carrier vehicle of an auxiliary recorder carriage located between adjacent shafts of the vehicle, a bearing member in said auxiliary recorder carriage, said bearing member having an open center, recorder supporting means universally mounted in the open center of said bearing, said recorder supporting means comprising a liquid container having cylindric portions of different diameter, and pistons of corresponding diameter in said cylindric portions, recording tape operating drums supported upon one of said pistons, recording means cooperating with said tape and operatively connected to means cooperating with the track to be operated by imperfections therein, said recording means and track cooperating means being supported by another of said pistons.

5. In apparatus for recording railway track imperfections, the combination with a suitable carrier vehicle of an auxiliary recorder carriage located between adjacent shafts of the vehicle, recorder supporting means universally mounted in said auxiliary carriage, said recorder supporting means comprising a liquid container having cylindric portions of different diameter, and pistons of corresponding diameter in said cylindric portions, said pistons being arranged one above another, recording tape operating drums supported upon a lower piston, recording means cooperating with said tape and operatively connected to means cooperating with the track to be operated by imperfections therein, said recording means and track cooperating means being supported by an upper piston.

6. Apparatus according to claim 5, in which said lower piston has a rod passing through said upper piston to support the drums.

In testimony whereof I hereunto affix my signature.

Dr. Ing. HANS DREYER.